(12) United States Patent
Smith et al.

(10) Patent No.: US 6,730,927 B1
(45) Date of Patent: May 4, 2004

(54) GAS FLOW MEASUREMENT DEVICE

(75) Inventors: Ian M. Smith, Westleigh (AU); Peter J. D. Wickham, deceased, late of Five Dock (AU), by Nicola Frances Wickham, legal representative; Shaun S. L. Law, Salter Point (AU)

(73) Assignee: Resmed Limited, North Ryde (AU)

( * ) Notice: Subject to any disclaimer, the term of this patent is extended or adjusted under 35 U.S.C. 154(b) by 505 days.

(21) Appl. No.: 09/584,751

(22) Filed: Jun. 1, 2000

(30) Foreign Application Priority Data

Jun. 11, 1999 (AU) .............................................. PQ0943

(51) Int. Cl.[7] .............................................. G01N 21/85
(52) U.S. Cl. ................ 250/573; 128/204.22; 73/861.74
(58) Field of Search .................................. 250/573–576, 250/231.13–231.19, 225, 237 R; 128/204.22; 73/861.74, 861.75; 600/539

(56) References Cited

U.S. PATENT DOCUMENTS

| | | | |
|---|---|---|---|
| 4,295,044 A | 10/1981 | Anderson et al. ........... 250/229 |
| 4,441,505 A | 4/1984 | Edwards et al. ............ 600/539 |
| 4,878,454 A | 11/1989 | Cann .......................... 118/663 |
| 4,945,344 A | 7/1990 | Farrell et al. ............... 340/610 |
| 5,816,246 A | 10/1998 | Mirza ......................... 600/539 |
| 5,847,288 A | 12/1998 | Hutchinson .............. 73/861.75 |
| 6,437,318 B1 * | 8/2002 | Egloff et al. ................ 250/225 |

* cited by examiner

Primary Examiner—Thanh X. Luu
(74) Attorney, Agent, or Firm—Nixon & Vanderhye P.C.

(57) ABSTRACT

Devices for the measurement of volumetric flow rate of a gas in a conduit are described. A vane arrangement is subjected to airflow and is displaced I response thereto. The vane arrangement forms a light guide, and one end of the vane arrangement receives an encoded light source, the encoding being over the range of displacement of the vane. In one form, the encoding can be achieved by a light source and a mask, the mask being shaped to provide for variance of the light transmitted therethrough as a function of the vane displacement range. One form of mask can be a tapered arrowhead. Embodiments of the flow rate measurement device offer good dynamic response. The measuring device can be incorporated in CPAP or ventilatory assist devices for the control thereof.

24 Claims, 10 Drawing Sheets

Fig. 12

GAS FLOW MEASUREMENT DEVICE

FIELD OF THE INVENTION

The present invention relates to a device for measuring the flow rate of a gas through a conduit, and in particular for measuring the flow rate of breathable gas flow associated with a non-invasive positive pressure ventilation (NIPPV) apparatus, continuous positive airway pressure (CPAP) apparatus, ventilatory assist device, or the like.

DEFINITION OF TERMS

The term 'conduit', used herein, is to be understood in a non-limiting sense. Particularly, it is not limited only to a flexible air hose that interconnects a flow generator with a patient mask for CPAP or assisted ventilation equipment.

In this specification, the phrases 'encode', encoder' or encoded' are to be understood as measuring any apparatus or operation that effects the fraction of transmitted light which is received by a detector.

BACKGROUND OF THE INVENTION

NIPPV apparatus function to supply a patient with clean breathable gas (usually air, with or without supplemental oxygen) at a therapeutic pressure or pressures, at appropriate times during the subject's breathing cycle. Such apparatus includes a blower to produce a flow of pressurised breathable gas, a gas supply conduit to receive said gas and an interface, typically a nasal mask, in turn to deliver the gas to the patient's airways. Further, there is a controller having control over operation of the blower, and a flow measuring device. Typical pressures delivered are in the range of 2 to 30 cm $H_2O$. Typical flow rates are in the range of −150 to 300 L/min. For certain applications in the field of NIPPV and CPAP it is necessary to detect flow signals with a frequency in the range 0 to 30 Hz.

Measurement of the volumetric flowrate of gas ("flow") in CPAP or ventilatory assistance devices is required for calculating the subject's ventilation, and to detect changes between the inspiratory and expiratory phases of breathing. It is very important that flow be determined accurately.

Typically, fixed or variable orifice meters are used to determine flow. In thes meters, a pressure transducer measures the pressure differential across a fixed or variable orifice. Problems with orifice meters include high pressure drop, poor gain and poor linearity at low flows.

Another known device for measuring the flow rate of a gas is the moving vane flow meter. In these meters, movement of the vane varies or produces changes in an inductive or capacitive electrical signal. Problems with the moving vane transducers include poor dynamic response and limited bandwidth. A further disadvantage of the moving vane transducer is that variations in ambient air temperature and air density can result in measurement errors. This is because the vane transducer inherently measures air mess, rather than air volume.

More sophisticated devices such as thermal flow meters (which measure the molecular flow of gas) and turbines type devices are generally too large and expensive for applications in the field of CPAP and NIPPV.

It is an object of the invention to overcome or at least ameliorate one or more the disadvantages of the prior art.

SUMMARY OF THE INVENTION

The invention discloses a measuring device for determining gas flow through a conduit, said device comprising:

a vane arrangement extending into the conduit to be displaceable under the influence of gas flow in the conduit;

a light source arranged to provide a uniform intensity of light over a range of displacement of the vane arrangement;

an optical encoder interposed between the light source and the vane arrangement effective over the range of displacement to encode the light source as a function of displacement of the vane arrangement under the influence of gas flow; and a light detector arranged to optically communicate with the encoded light source and provide an output signal based thereupon related to gas flow.

In one form, the vane arrangement forms at least one light guide, and the encoder is interposed between one or more free ends of the light guide and the light source so that the encoded light is optically communicated to one or more light guides. In another form, the vane arrangement has two light guides, and the encoder has two rows of regularly spaced discrete light sources aligned with a free end of the respective light guide. In a further form, the vane arrangement carries a first polarizing element, and the first polarizing element and a second, fixed polarizing element form the optical encoder. The light source, first and second polarizing elements and the light detector are in optical alignment, with the planes of polarization of the respective first and second polarizing elements interacting as a function of displacement of the vane element to result in a range of optical transmitivities.

A measuring device as described above can be included in CPAP or ventilatory assistance devices. Such apparatus includes a blower to produce pressurized breathable gas, a gas supply conduit to receive said gas and a device, typically a mask, in turn to deliver the gas to the patient's airways. Further, there is a controller having control over operation of the blower, and the flow measuring device provides its output gas flow signal to the controller as a control variable therefor.

The invention further discloses a method for detecting gas flow through a conduit, comprising the steps of:

encoding the light source as a function of a displacement of a vane arrangement located within the conduit under the influence of gas flow; and detecting the encoded light and producing an output signal representative thereof related to gas flow.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS AND BEST MODE

Figure 1:
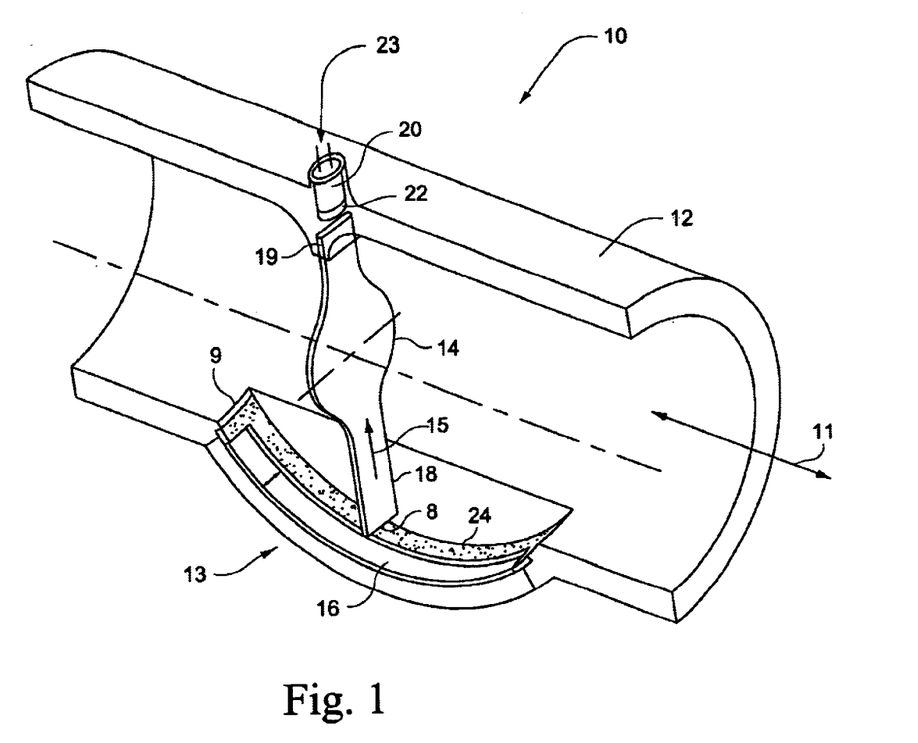
FIG. 1 is a perspective view of a longitudinal cross-section of a conduit, fitted with first form of flow sensor.

Referring to FIG. 1, there is shown a flow sensor 10 arranged inside a conduit 12 associated with a CPAP apparatus, ventilatory assist device, or the like. The conduit 12 provides a path for breathable gas to flow in either direction, denoted by reference numeral 11. The flow sensor can be positioned in the air conduit, near the patient mask or generally at some position downstream of the blower sourcing the breathable gas.

The flow sensor 10 includes a "light-pipe" vane 14, an arcuate portion 13, and a light detector 20. The vane 14 is formed from a very light polymer material such as acrylic, that is optically transparent. The shape of the vane 14 can be other than shown in FIG. 1, as will be later discussed in relation to FIG. 5.

The vane 14 extends from an attachment end 19 formed in a wall portion of the conduit 12 such that a free end 18 of the vane 14 is able to swing substantially throughout a range extending over the arcuate portion 13 in response to gas flow through the conduit 12. A constant radial distance is maintained between an upper plane 9 of the arcuate portion 13 and a polished end surface 8 of the free end 18 during a full range of normal movement of the vane 14.

When light from a uniform light source 16 reaches the arcuate portion 13, subject to the influence of an encoder, in the form of a mask 24 located on the arcuate portion 13, the polished end surface 8 of the free end 18 receives and transmits light in a lengthwise direction 15 through the length of the vane 14.

Figure 2:
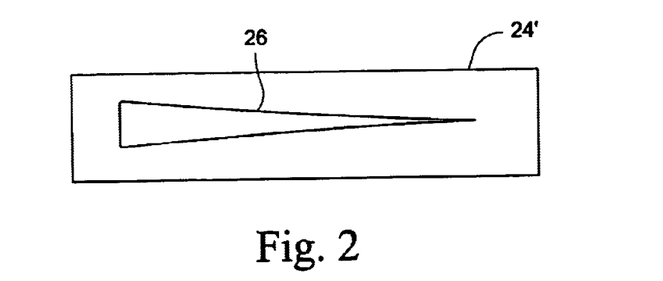
FIG. 2 is a flattened plan view of a mask used in the flow sensor of FIG. 1.

The relationship of gas flow to radial displacement of the vane 14 through the arcuate portion 13 is typically non-linear. This non-linearity can be compensated, if necessary, by adopting a mask shape 24' having an aperture 26, as shown in FIG. 2. Alternatively, this non-linear characteristic can be compensated in post-detection processing.

The attachment end 19 of the vane 14 is in optical contact with a detection face 22 of the light detector 20. The light detector 20 provides an electrical output signal at the pins 23 according to an intensity of light received on the detection face 22 which has travelled in direction 15 discussed above. A suitable is the Honeywell™ phototransmitter #SD3443, used in its linear range. The intensity of light received on the detection face 22 corresponds to the position of the polished end surface 8 of the vane 14 in relation to the arcuate portion 13, by virtue of the variation of light source intensity transmitted through the mask 24, 24'.

The flow sensor 10 can be used to determine gas flow direction by virtue of the smallest aperture/minimum detected voltage output at the pins 23, occurring at a maximum flow position of the vane 14 is a first direction. A largest aperture/maximum detected voltage output at pins 23 occurs at the maximum flow position of the vane 14 in a second, opposite direction. Zero gas flow therefore occurs when a voltage output at pin 23 equals a mid-voltage value between the maximum and minimum values.

The light source 16 is desirably of uniform intensity across the full range of the aperture 26 of the mask 24 which communicates with a polished end surface of the free end 18. This uniformly of the light source 16 can be achieved in various ways, as will now be discussed.

Figure 3:
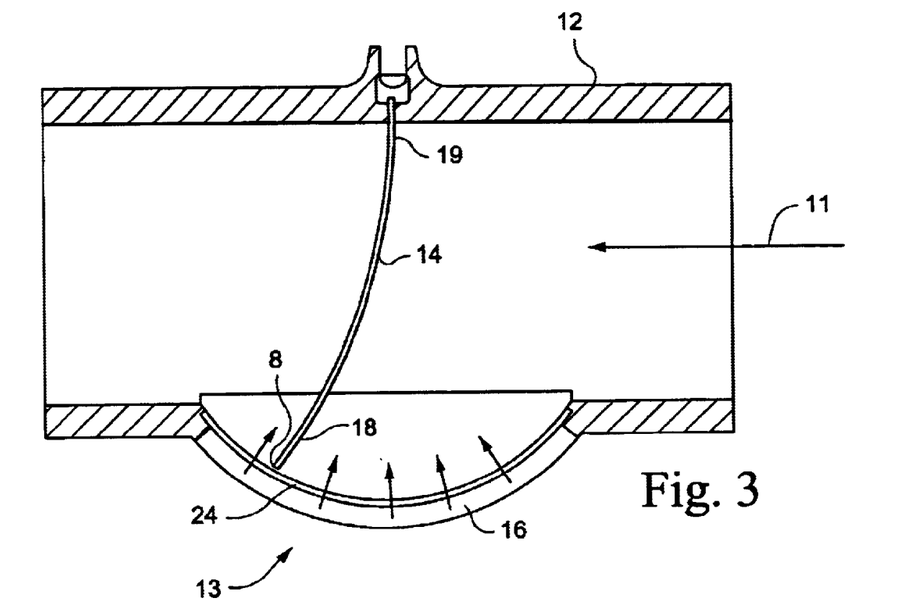
FIG. 3 is a longitudinal cross-section of a conduit, fitted with a second form of flow sensor.

Referring to FIG. 3, which is a cross-sectional view of the flow sensor 10, the light source 16 can be an electroluminescent film (e.g., Selkosha™ EL film) formed into the required curved shape and be directly laminated on a back face of the mask 24. An alternative can be an LED back-lit panel.

Figure 4:
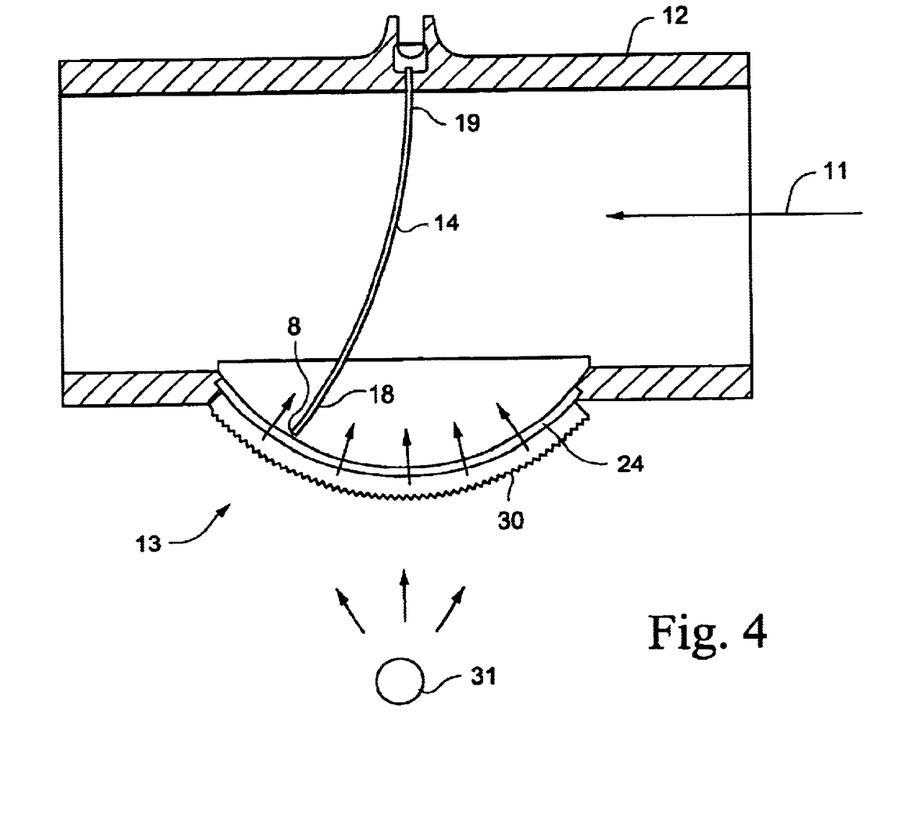
FIG. 4 is a longitudinal cross-section of a conduit, fitted with a third form of flow sensor.

A further alternative arrangement for achieving a uniform light source is shown in FIG. 4, where a light diffuser 30 is placed between a lamp 31 (or lamps) provided externally to the actuate portion 13.

The mask 24, serving as an analogue intensity encoder, can be manufactured in various ways, including a photographically produced opaque outline onto translucent glass or polymer, or laser cut/chemically etched thin metal film. It can also be integral of the arcuate portion 13, for example, as an injection molded part.

Figure 5:
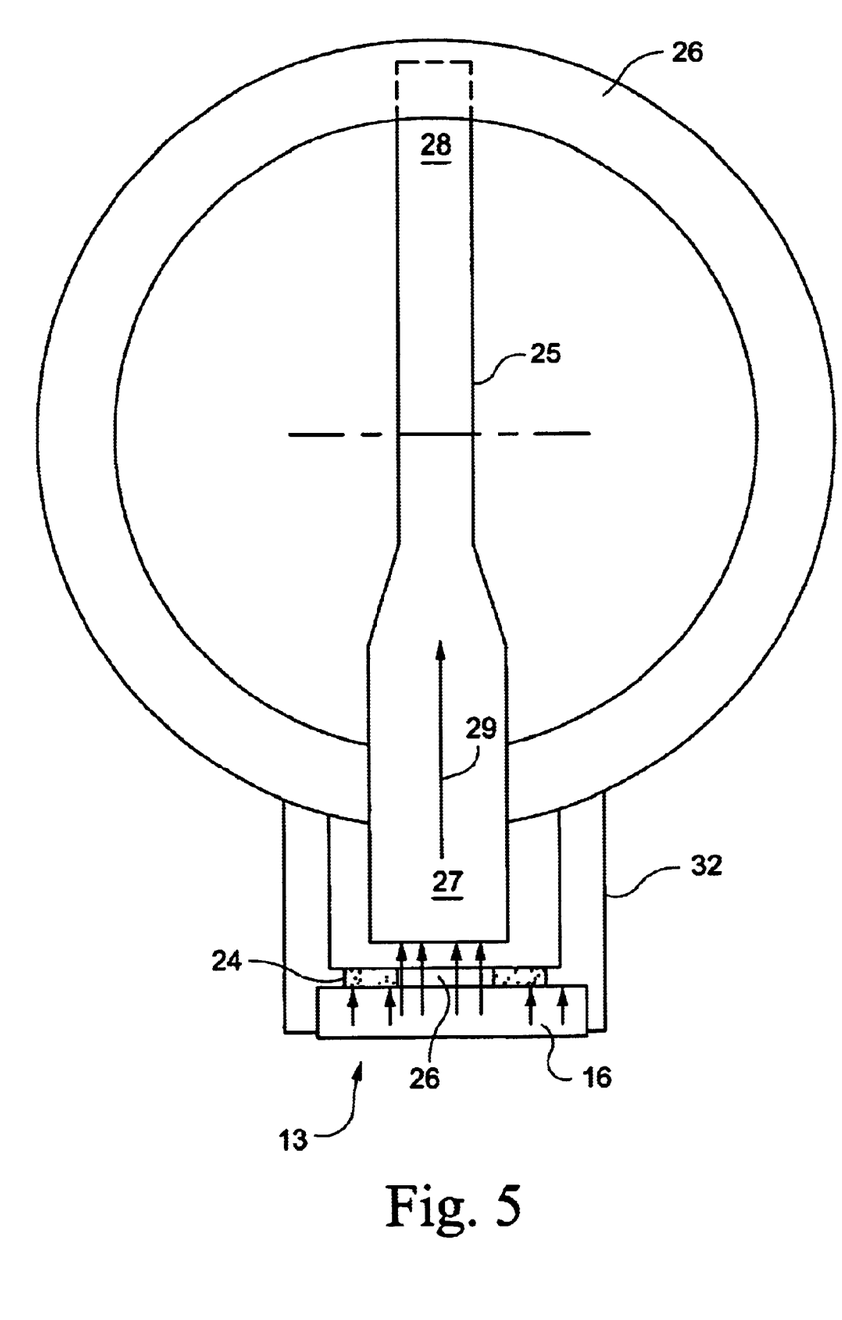
FIG. 5 is a transverse cross-section of the conduit and flow sensor of FIG. 1.

Referring to FIG. 5, another form of vane 25 is shown in transverse cross-section with respect to a conduit 26. A housing 32 extends from the conduit, in which the light source 16 is located. The free end 27 of the vane 25 is generally wider than an attachment end 28, so as to provide a maximum bending angle of the vane 25 throughout the arcuate portion 13, for a given surface area of the vane 25 presented to gas flow in the conduit 26. This minimisation of the surface area of the upper portion of the vane 25 minimises gas flow restriction, inertia and pressure losses that are usually associated with prior art vane sensors.

The light transmission path 29 of the vane 25 is an optical flow of flattened rectangular cross-section. Typically, there will be minimal light entering the vane 25 through the side walls, due to the small angles of incidence to those surfaces which (obeying Snell's law) results mostly in external reflection from the surface. However, if otherwise necessary, the entire vane 25, except for the polished end, can be coated with opaque material.

A yet further form of flow sensor will now be described with reference to FIGS. 6 and 7. Here, the varying aperture (analog) encoding mask 24 of FIG. 5 is replaced with a 'digital' encoder in the form of having two rows (channels) of slots 44, 45, each row being parallel to the gas flow direction 11 as shown. The vane 41 is split into two separate light pipes 46, 47, each of which corresponds to one of the two provided rows of slots 44, 45 of the mask 40. A pair of light detectors (not shown) are also provided, each of which corresponds to a single row of slots 44, 45 and its associated light guide 45, 47. The encoder-type mask 40 can be manufactured using the same processes as that described earlier for the analog mask.

When the vane 41 is displaced in response to gas flow through the conduit, the amplitude of the light received for each of the two channels is detected as pulses, which can be processed as digital signals. An example of a suitable detector is the Honeywell™ Optoschmitt detector #SD5620-1. Similar to the arrangement shown in FIG. 1, a light detector is placed at the receiving attachment end of which of the two channels.

Figure 7:
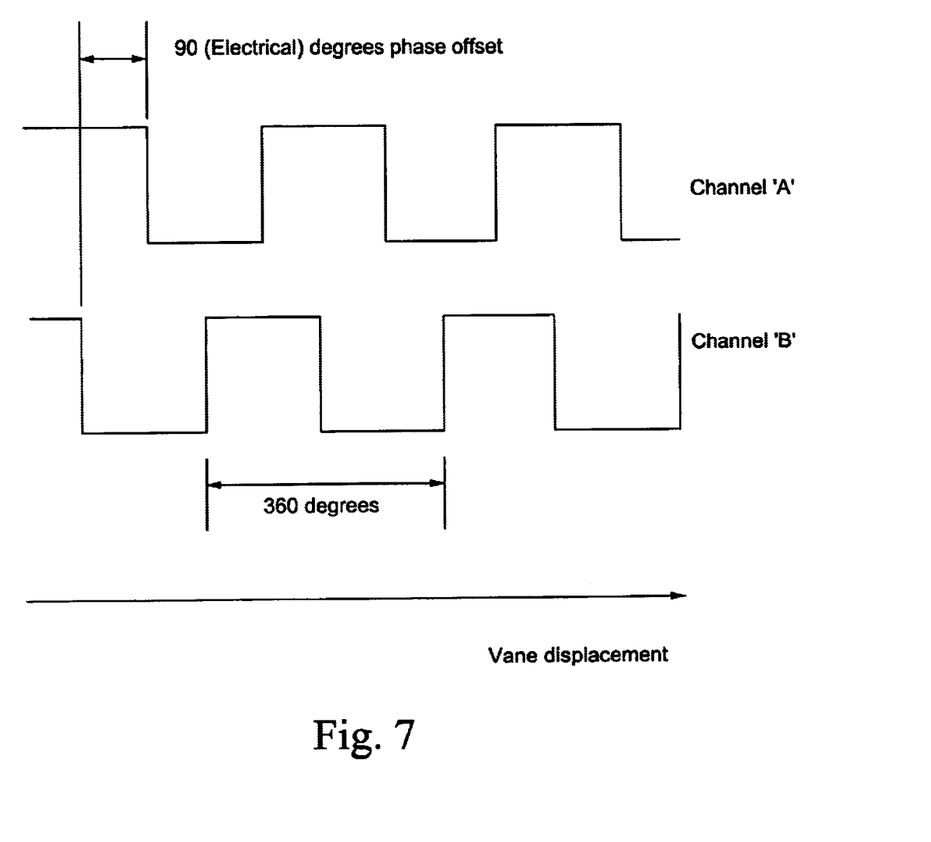
FIG. 7 is a timing diagram used in the embodiment of FIG. 6.

By spacing the two channels 90 degrees (electrical) apart, as shown in FIG. 7, (in the direction of vane movement) the directions of motion can be determined by the unique combination of paired outputs of the digital state of each of the detectors in channels A & B. For example, movement of the light guides in one direction may result in an output of: (1,1) (1,0) (0,0), (0,1) (1,1). Movement in the reverse direction may result in the following output: (1,1), (0,1), (0,0) and (1,1). These two patterns are distinct and hence flow direction can be determined.

The quantity 360 electrical degrees is the distance between corresponding slots, equivalent to the distance between successive rising edges of the resultant electrical pulses. Therefore, 90 electrical degrees is equivalent to ¼ wavelength.

The value of flow is determined by the absolute number of output pulses counted, relative to the zero count (i.e. flow generator/blower off). Changes in flow are determined by incremental changes in encoder output.

Further, the vane movement versus flow relationship can be linearized by either spacing the slots in a non-linear pre-determined pattern, or linearized in post-detection processing. The "home" or indexed position of the encoder is defined during machine start-up as being zero pulses at zero flow.

Figure 6:
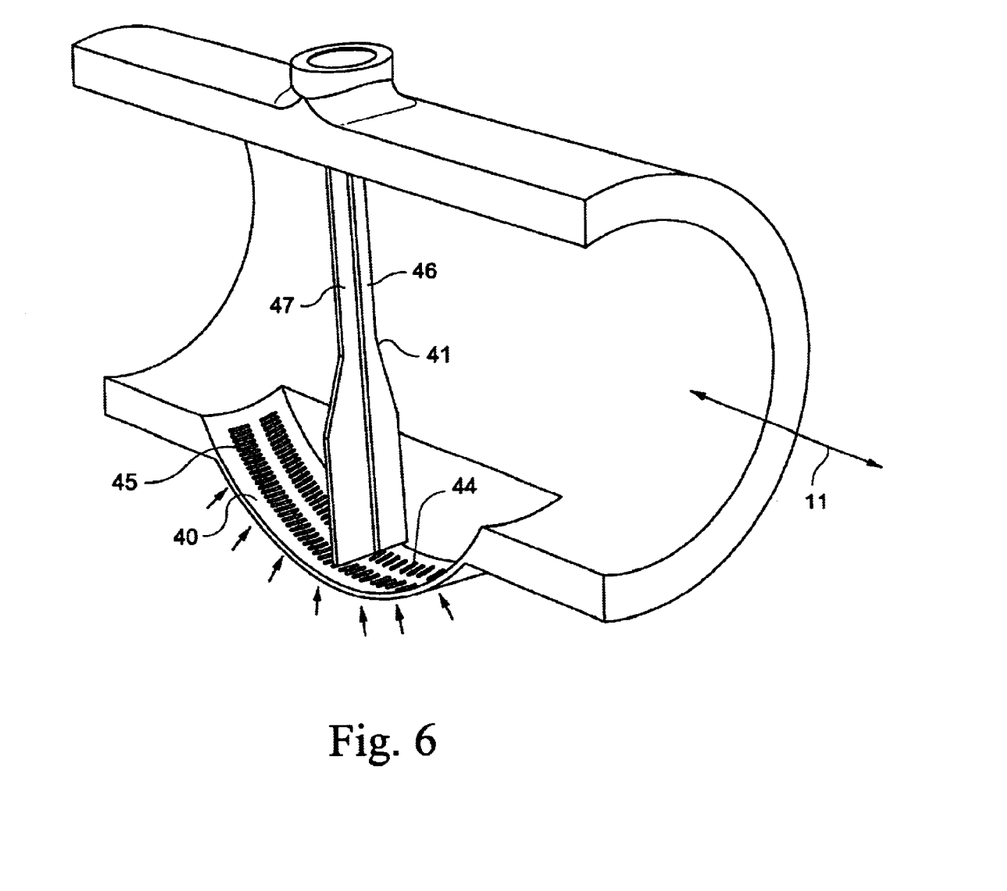
FIG. 6 is a perspective view of a longitudinal cross-section of a conduit, fitted with a fourth form of flow sensor.

A principal advantage of the embodiment of FIGS. 6 and 7 is that a digital TTL/LSTTL/CMOS compatible output can be provided for direct interfacing to digital circuitry. This usually results in a more stable output and a reduction in parts costs (e.g., an analogue-to-digital conversion is not required).

The function of light guides may also be achieved by the use of optical fibers of circular cross-section (typically in the range 1.0 to 1.5 mm diameter), rather than of rectangular section. Those fibers may be flexible, with one end fixed or attached into a housing, or rigid with one end connected to a pivot.

For an analog sensor of FIGS. 1 to 5, a possible disadvantage of a small diameter optical fiber, compared to a more broad rectangular section, is that the tip diameter could be too small in comparison to the required change in aperture as controlled by the light mask 24. In that case, the planar vane 14 may be preferred.

Figure 8A:
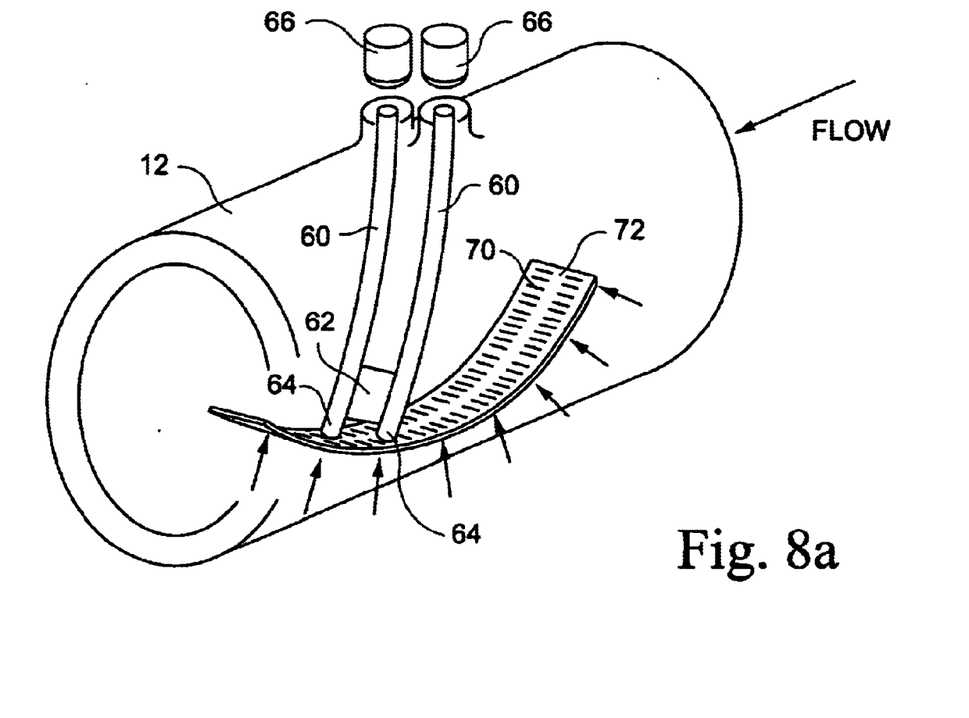
FIGS. 8a and 8b are schematic diagrams of a fifth form of a flow sensor, having a digital encoder and circular section flexible light guides.
Figure 8B:
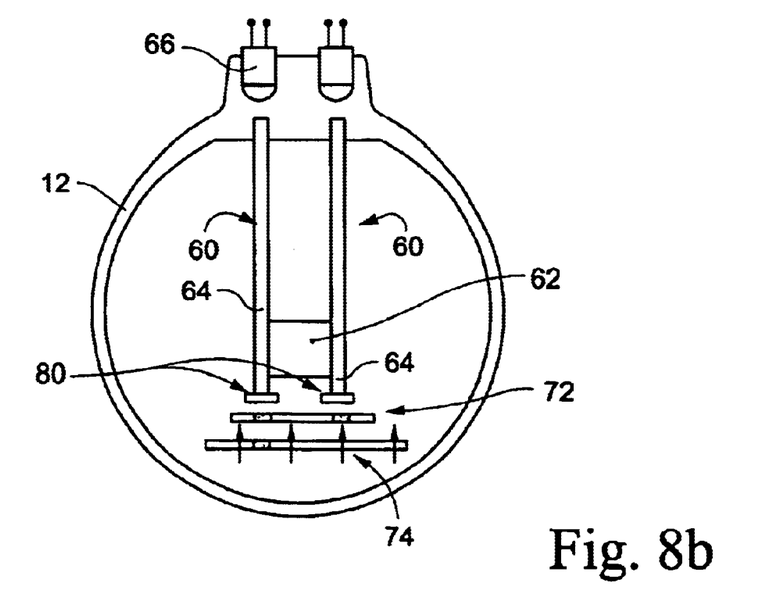

Another form of digital sensor using small circular section light guides as an encoder, is shown in FIGS. 8a and 8b. In this arrangement, two circular section fibers 60 are mounted parallel to each other and mechanically inter-connected by a web section 62 such that they move together when subjected to air flow. The free ends 64 of the light guides 60 are in optical communication with light detectors 66. The free ends receive an interrupted/discretely spaced light pulse as they each sweep over a mask/encoder under the influence of flow in the conduit 12. The encoder is formed by patterns of slots 70 that resemble a grid of alternate opaque/transparent areas on a mask 72. The mask 72 is located between a uniform light source 74 and the free ends 64.

A second mask 80, comprising only one 'slot', is fixed to the ends of the free end 64 of each fiber 60, with this single slot aligned to be parallel to the main mask slot 70. The purpose of the second mask 80 is to ensure that only the light from one slot at a time is received by the free ends 64 of the light guides 60.

As in the case for FIG. 6, two output channels, disposed out-of-phase by 90 electrical degrees, are required in order to determine the direction of flow.

Another form of sensor, using polarizing film placed between a light source and detector, is shown in FIGS. 9a to 9d.

In common with the preceding forms of sensor, the movement of a lightweight vane under the influence of gas flow is optically sensed. Two polarizing films, placed parallel to each other, vary the transmitivity of light according to the relative angle of the polarizing planes of the films. That is, if one film is caused to rotate relative to the other film, whilst the planar surfaces of the films remain parallel, the intensity of light transmitted to a detector on the other sid of the films is increased or decreased depending on the initial polarizing orientation, and the angle of rotation.

Figures 9A, 9B:
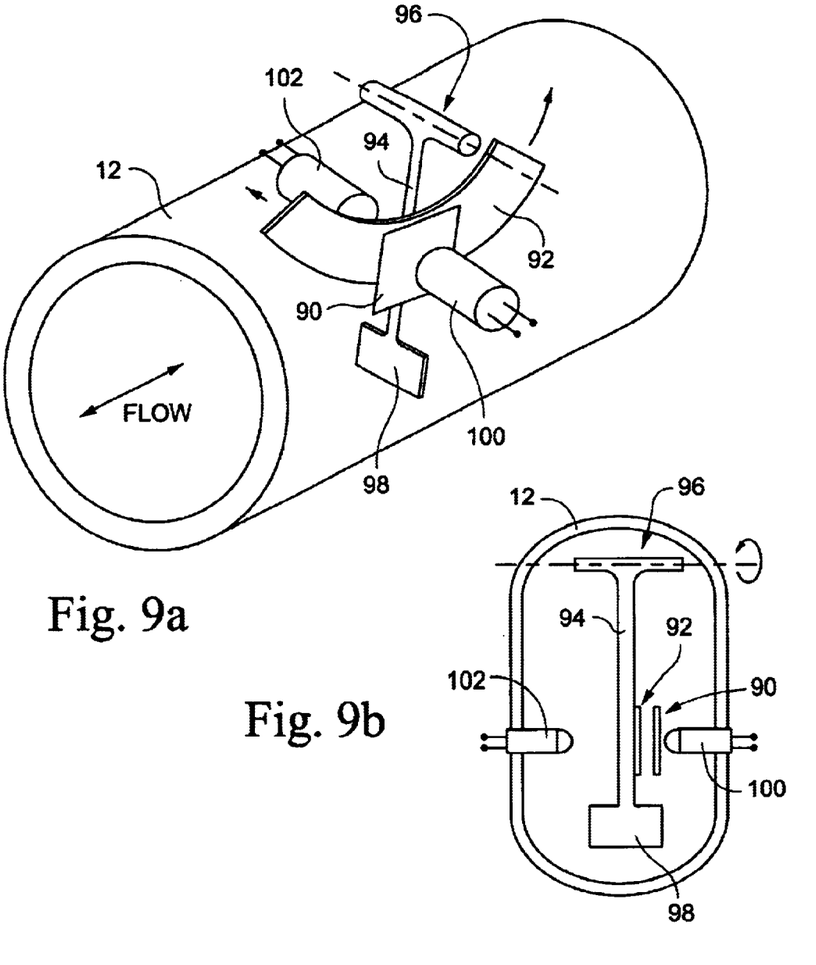
FIGS. 9a–9d are schematic diagrams of a sixth form of flow sensor, using polarizing films.

As shown in FIGS. 9a and 9b, a flow sensor has one fixed polarizing film 90, polarizing its surface being parallel to flow in the conduit 12, and a second parallel film 92 in the shape of an arc fixed to the shaft portion of a lightweight vane 96. The vane has a small sail 98 at its free end in order to assist in achieving an appropriate deflection.

The two films are arranged so that the light from an LED 100 (or similar source), mounted on one side of the conduit 12, is directed along a line perpendicular (i.e. in alignment with) to the two polarizing films 90, 92 to be detected by a detector 102 on the other side of the conduit 12. The two films 90, 92 act as an optical encoder, in this case by the interaction of the relative orientation of their planes of polarization. The alignment shown in FIGS. 9a and 9b corresponds to zero flow, and is at the mid-point of the moving polarizing film 92.

At zero flow, the polarizing planes of the two films 90, 92 must be aligned somewhere between 0 and 90° orientation relative to each other. This is necessary in bi-directional flow applications whereby flow direction is determined according to whether the detected light intensity increases for flow in one direction, or decreases for flow in the other direction.

Figure 9C:
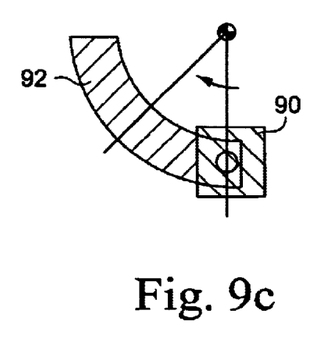
Figure 9D:
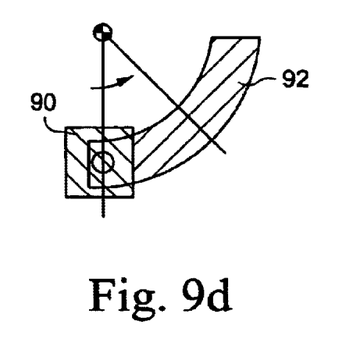

As shown in FIGS. 9c and 9d, the maximum and minimum detected light intensities occur at 90°, i.e. when the polarizing planes of the two films are either perpendicular or parallel.

Figure 10:
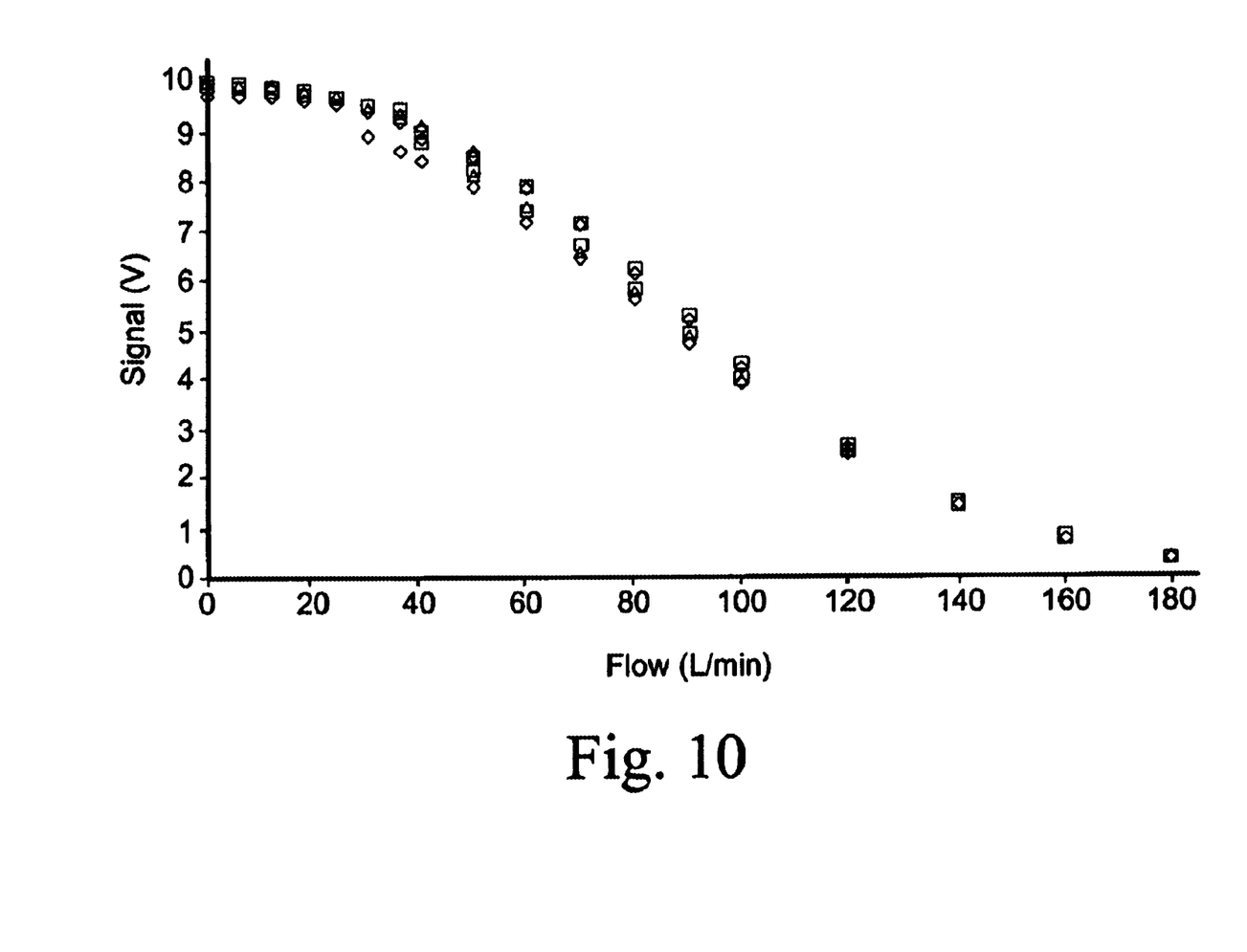
FIG. 10 is a graph showing the relation between sensor output voltage versus flow.

The sensor output voltage versus flow characteristic, for the sensor of FIGS. 9a–9d, is shown in FIG. 10, where the flow of variable was determined using a hot-wire flow meter. The triangle, square and diamond symbols shown represent each of three tests.

Figure 11:
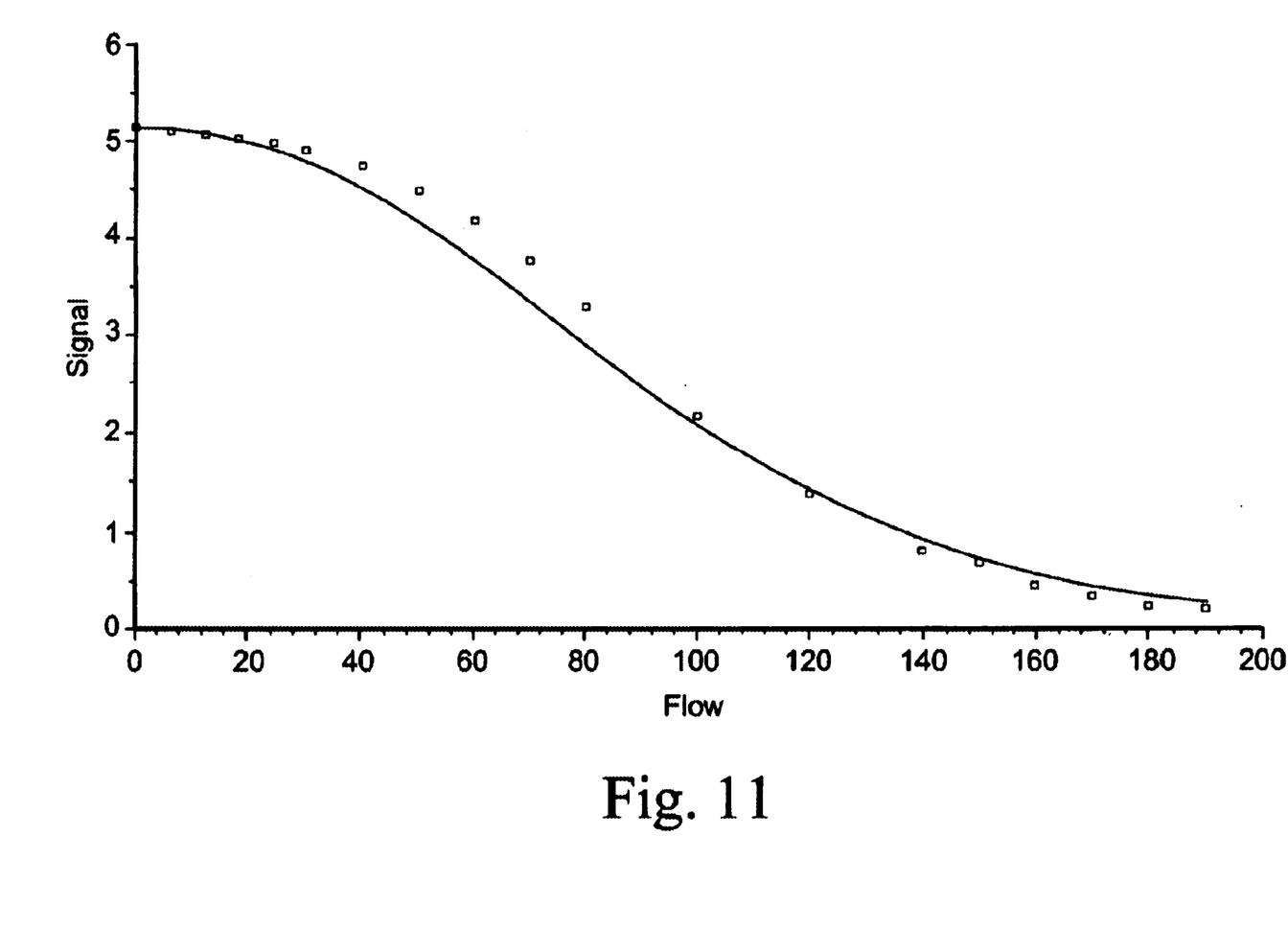
FIG. 11 is a graph comparing the experimental output/flow characteristics for a set of measurements and theoretical calculations.

FIG. 11 shows the experimentally determined characteristic of FIG. 10 mapped against a theoretical prediction, showing good correlation. The theoretical curve has been determined from the following equations:

$$Q = (A_1 - A_2\Omega)\sqrt{\frac{K_2 \cos^{-1}\Omega}{K_1 \cos^2\Omega}}$$

where:

$A_1$: Cross-sectional area of the housing inlet $A_2$: Cross-sectional area of pressure drag (the vane)

$K_s$: Spring constant $$\Omega = \sqrt{\frac{I}{I_{max}}}$$

l: Light intensity $K_1$: A system parameter

A general procedure which calibrates the flow transducer in all its forms, whenever the gas blower associated with the conduit, to which the flow transducer is measuring, it started will now be described. This calibration procedure includes the operation of a blower at a specific condition (e.g., pump/motor speed or applied motor voltage), which normally corresponds to a known flow rate (say 150 l/min) at original manufacture conditions. During subsequent start-ups of the blower at any other environmental condition, the indicated flow rate would be compared to the original calibrated flow value, thereby permitting a correction to be made, if necessary.

The correction that can be made to the measured gas flow include: (i) a constant off-set value, (ii) a percentage of the indicated value, or (iii) a non-linear correction. The correction may be set until the next time the gas blower is started.

The environmental conditions that would normally be expected to affect air density, and consequently the accuracy of the flow meter, includes changes in relative humidity, altitude and ambient temperature. Because of the calibration adjustment, the sensor voltage output/logic value at zero flow is unchanged by variations in the environmental factors described.

Figure 12:
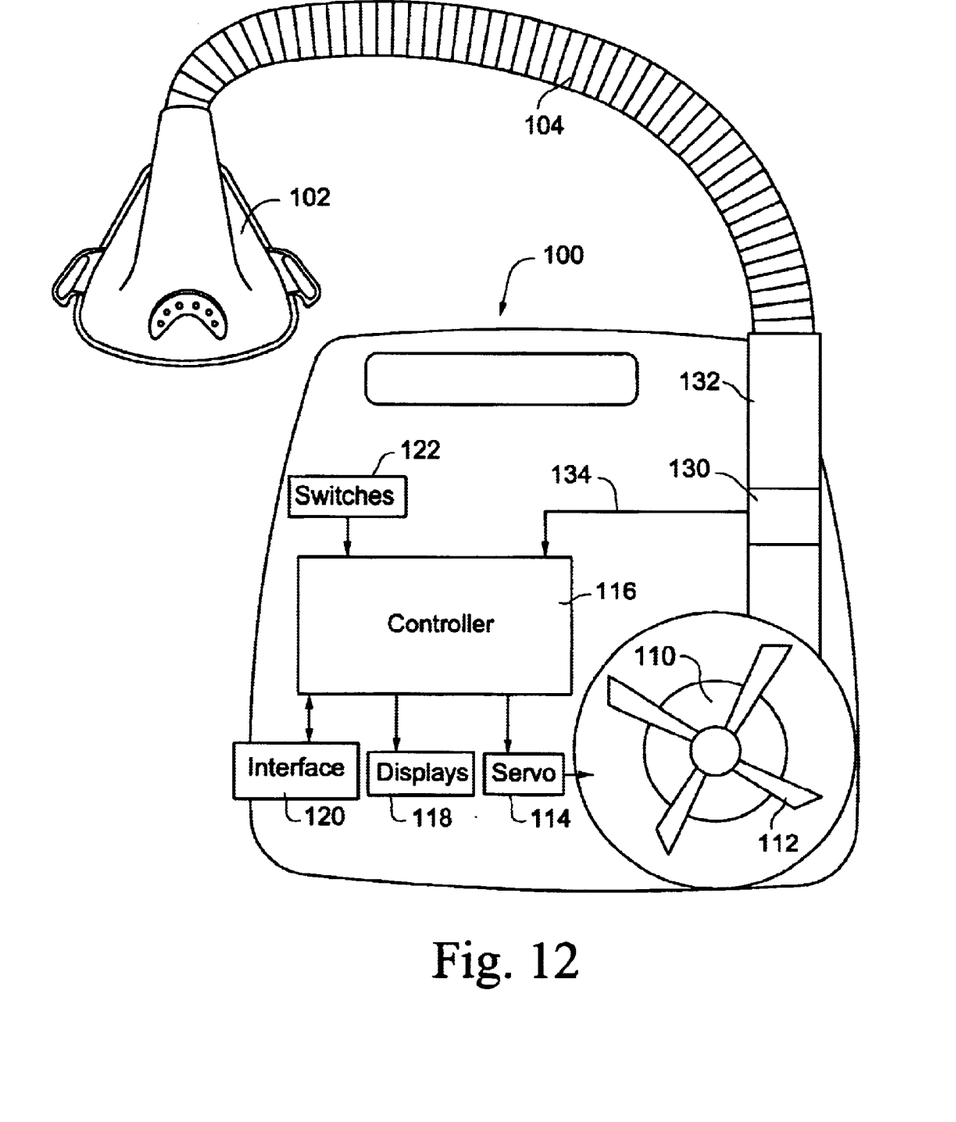
FIG. 12 is a schematic diagram of CPAP or assisted ventilation apparatus incorporating a flow sensor.

FIG. 12 shows a representative schematic diagram for CPAP or assisted ventilation apparatus. A flow generator 100 provides pressurized gas to a patient mask 102 via a flexible tube 104. Within the flow generator is provided a blower, in the form of a motor 110 driving an impeller 112. The motor 110 is speed controlled by a servo 114, and in this way of pressure of gas supplied to the mask can be controlled. A controller 116 provides a controlling signal to the servo 114. The controller also provides output data to operator displays 118, and has an external interface port 120 for programming and diagnostic purposes. Operational signals from switches 122 also are received by the controller 116.

A flow sensor 130, in accordance with any one of the embodiments described above, is located in the output conduit 132 extending from the impeller housing. The output flow signal 134 is provided to the controller 116 where, in accordance with a relevant known voltage versus flow characteristic (whether determined experimentally or theoretically, such as in FIGS. 10 and 11), is applied to determine the absolute value of flow. This flow information can then be processed in any known manner to control the supply of CPAP or assisted ventilation treatment pressure to a patient.

Advantages given by a measuring device in accordance with one or more embodiments of the invention over prior art flow meters include that:

(1) It has a good dynamic response due to the low inertia of the vane and fast electrical response of the light detector.
(2) There is a low pressure drop across the vane due to the narrow width and small area.
(3) It is simple to construct.
(4) It has a theoretical infinite resolution when using an analog electrical signal.
(5) It has one-point calibration at zero flow point, for zero flow DC signal.
(6) It has automatic calibration during start-up to correct for air density, relative humidity and temperature.

Although the invention has been described with reference to the specific examples, it will be appreciated by those skilled in the art, that the invention can be embodied in many other forms.

We claim:

1. A measurement device for determining gas flow through a conduit, said device comprising:
 a vane arrangement extending into the conduit to be displaceable under the influence of gas flow in the conduit;
 a light source arranged to provide a uniform intensity of light over a range of displacement of the vane arrangement;
 an optical encoder interposed between the light source and the vane arrangement effective over the range of displacement to encode light from the light source as a function of displacement under the influence of gas flow; and
 a light detector arranged to optically communicate with the light from the light source, following encoding by the encoder, and to provide an output signal, in accordance with the encoded light, related to gas flow, wherein the vane arrangement is attached to an inner wall of the conduit and forms at least one light guide including a free end and an attached end, and said encoder is interposed between each said free end and the light source so that light encoded by the encoder is optically communicated to each said light guide each by each said free end, and further wherein said light detector optically communicates with each said light guide at the attached end of the vane arrangement.

2. The measuring device of claim 1, wherein the encoder comprises a mask extending over said range of displacement, said mask being configured to transmit a range of light intensities as a function of position along a length of the mask.

3. The measuring device of claim 2, wherein said mask is tapered.

4. The measuring device of claim 3, wherein said mask has a double taper to form an arrowhead shaped aperture.

5. The measuring device of claim 1, wherein said vane arrangement has two light guides, and said encoder comprises two rows of regularly spaced discrete light sources aligned with the free end of the respective light guide, and further wherein said light detector provides two output signals, one for each respective light guide.

6. The measuring device of claim 5, wherein said discrete light sources are formed by slots made in an opaque material covering a sheet of light transmission material.

7. The measuring device of claim 1, wherein said vane arrangement has a smaller gas impinging dimension in a portion proximate the attached end that at the free end.

8. The measuring device of claim 1, wherein the vane arrangement carries a first polarizing element, and said first polarizing element and a second, fixed polarizing element form the encoder, and further wherein said light source, said first and second polarizing elements and said light detector are in optical alignment, the planes of polarization of the respective first and second polarizing elements interacting as a function of displacement of said vane arrangement to result in a range of optical transmitivities.

9. The measuring device of claim 8, wherein said first polarizing element is arcuately shaped.

10. The measuring device of claim 8, wherein said vane arranged is formed as: (i) a pivoting shaft to which is attached said first polarizing element, and (ii) a distally located vane element.

11. The measuring device of claim 10, wherein said first polarizing element is arcuately shaped.

12. CPAP or assisted ventilation apparatus comprising:
 a blower to produce pressurized breathable gas;
 a gas supply conduit to receive said breathable gas;
 a device to deliver said gas, received from said conduit, to a patient's airways;
 a controller having control over operation of the blower; and a flow measuring device as claimed in claim 1, and wherein the output gas flow signal thereof is provided to the controller as a control variable therefor.

13. A measuring device for measuring gas flow through a conduit, said device comprising:

a light guide extending into the conduit from a fixed end thereof and being displaceable under the influence of gas flow in the conduit;

a light source providing a uniform intensity of light over a range of displacement of said light guide;

an optical encoder interposed between the light source and a vane arrangement effective over the range of displacement to encode light from the light source as a function of displacement of the light guide under the influence of gas flow, the light from the light source, after encoding by the encoder, being optically communicated to the light guide through a free end of the light guide; and a light detector arranged to optically communicate with a fixed end of the light guide to receive said light from the light source encoded by the encoder and provide an output signal related to gas flow in accordance with the encoded light.

14. The measuring device of claim 13, wherein the encoder comprises a mask extending over said range of displacement, said mask being configured to transmit a range of light intensities as a function of position along a length of the mask.

15. The measuring device of claim 14, wherein said mask is tapered.

16. The measuring device of claim 15, wherein said mask has a double taper to form an arrowhead shaped aperture.

17. A measuring device for determining gas flow through a conduit, said device comprising:

two light guides arranged side-by-side and extending into the conduit, each of said light guides including a free end and a fixed end, each said free end being displaceable under the influence of gas flow in the conduit;

a light source arranged to provide a uniform intensity of light over a range of displacement of the light guides;

an optical encoder having two parallel rows of slots aligned with the respective free ends of the light guides to encode light from the light source as a function of displacement of the light guides under influence of gas flow; and a light detector arranged to optically communicate with the fixed ends of the light guides to receive the encoded light from the light source and provide an output signal related to gas flow in accordance with the encoded light.

18. The measuring device of claim 17, wherein said rows of slots are formed by an opaque material covering a sheet of light transmission material.

19. A measuring device for measuring gas flow through a conduit, said device comprising:

a light source arranged to provide a uniform intensity of light over a range of displacement of the vane arrangement;

a first polarizing element, carried by the vane arrangement, and a second polarizing element interposed between said first polarizing element and said light source, all in optical alignment, said first and second polarizing elements forming an optical encoder by the planes of polarization of the respective polarizing elements interacting as a function of displacement of said vane arrangement to result in variable optical transmitivity; and a light detector arranged to receive light from the light source, following encoding by the encoder, and to provide an output signal related to gas flow in accordance with the encoded light.

20. The measuring device of claim 19, wherein said vane arrangement is formed as (i) a pivoting shaft to which is attached said first polarizing element, and (ii) a distally located vane element.

21. The measuring device of claim 20, wherein said first polarizing element is arcuately shaped.

22. CPAP or assisted ventilation apparatus comprising:

a blower to produce pressurized breathable gas;

a gas supply conduit to receive said breathable gas;

a device to deliver said gas, received from said conduit, to a patient's airways;

a controller having control over operation of the blower; and a flow measuring device comprising:

a light guide extending into the conduit from a fixed end thereof and being displaceable under the influence of gas flow in the conduit;

a light source providing a uniform intensity of light over a range of displacement of said light guide;

an optical encoder interposed between the light source and a vane arrangement effective over the range of displacement to encode light source as a function of displacement of the light guide under the influence of gas flow, the light from the light source, after encoding by the encoder, being optically communicated to the light guide through a free end of the light guide; and a light detector arranged to optically communicate with the a fixed end of the light guide to receive said light from the light source encoded by the encoder and provide an output signal related to gas flow in accordance with the encoded light, and wherein the output gas flow signal is provided to the controller as a control variable therefor.

23. CPAP or assisted ventilation apparatus comprising:

a blower to produce pressurised breathable gas;

a gas supply conduit to receive said breathable gas;

a device to deliver said gas, received from said conduit, to a patient's airways;

a controller having control over operation of the blower; and a flow measuring device comprising:

two light guides arranged side-by-side and extending into the conduit, each of said light guides including a free end and a fixed end, each said free end being displaceable under the influence of gas flow in the conduit;

a light source arranged to provide a uniform intensity of light over a range of displacement of the light guides;

an optical encoder having two parallel rows of slots aligned with the respective free ends of the light guides to encode light from the light source as a function of displacement of the light guides under influence of gas flow; and a light detector arranged to optically communicate with the fixed ends of the light guides to receive the encoded light from the light source and provide an output signal related to gas flow in accordance with the encoded light;

and wherein the output gas flow signal is provided to the controller as a control variable therefor.

24. CPAP or assisted ventilation apparatus comprising:

a blower to produce pressurised breathable gas;

a gas supply conduit to receive said breathable gas;

a device to deliver said gas, received form said conduit, to a patient's airways;

a controller having control over operation of the blower; and a flow measuring device comprising:

a vane arrangement extending into the conduit from a fixed end thereof and being displaceable under the influence of gas flow in the conduits;

a light source arranged to provide a uniform intensity of light over a range of displacement of the vane arrangement;

a first polarizing element, carried by the vane arrangement, and a second polarizing element interposed between said first polarizing element and said light source, all in optical alignment, said first and second polarizing elements forming an optical encoder by the planes of polarization of the respective polarizing elements interacting as a function of displacement of said vane element to result in variable optical transmitivity; and a light detector arranged to receive light from the light source, following encoding by the encoder, and to provide an output signal related to gas flow in accordance with the encoded light;

and wherein the output gas flow signal is provided to the controller as a control variable therefor.

* * * * *